Figure 1:
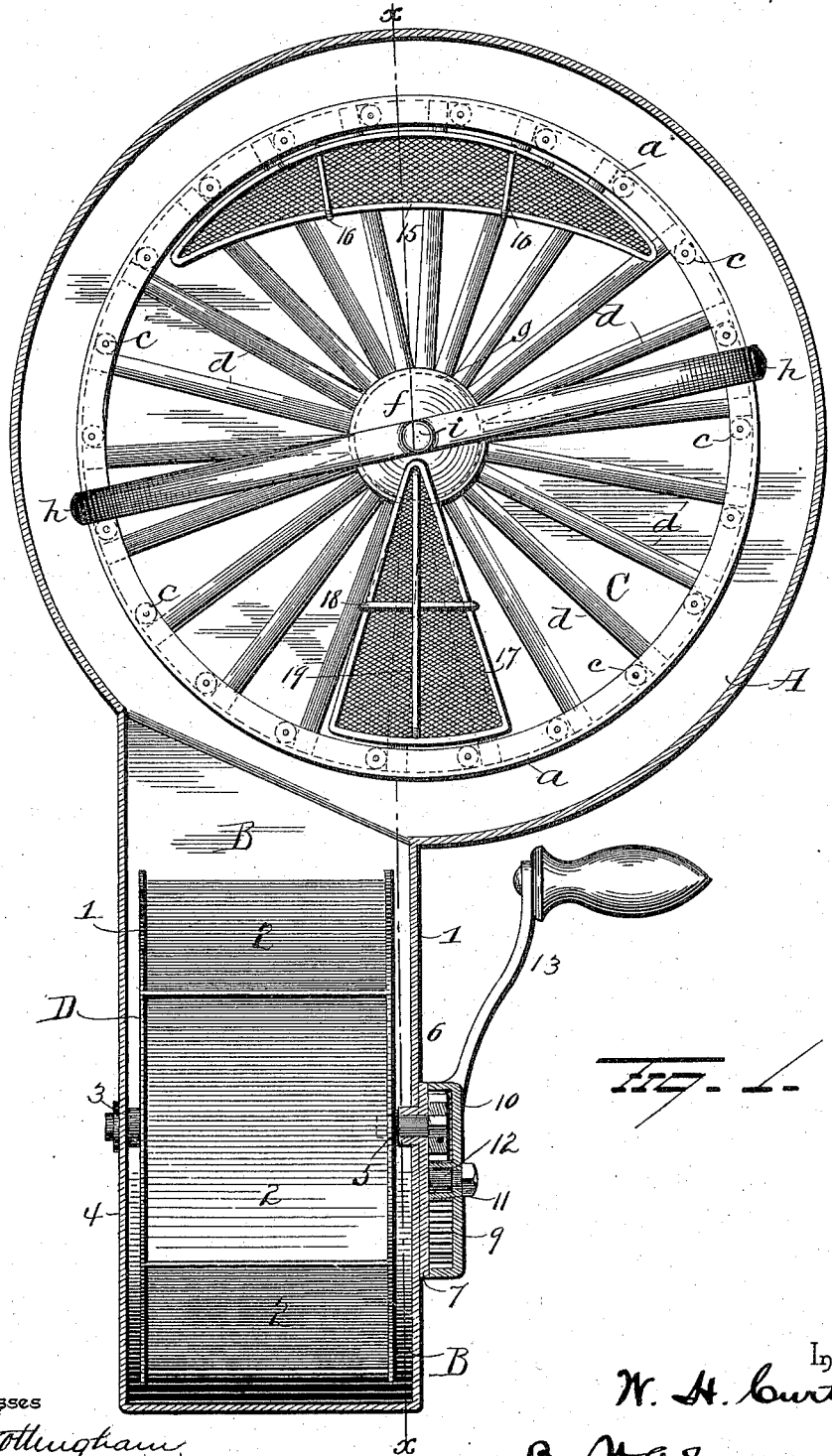

(No Model.) 2 Sheets—Sheet 1.

W. H. CURTICE.
DISH CLEANER.

No. 577,725. Patented Feb. 23, 1897.

Witnesses
E. J. Nottingham
G. F. Downing

Inventor
W. H. Curtice
By H. A. Seymour
Attorney

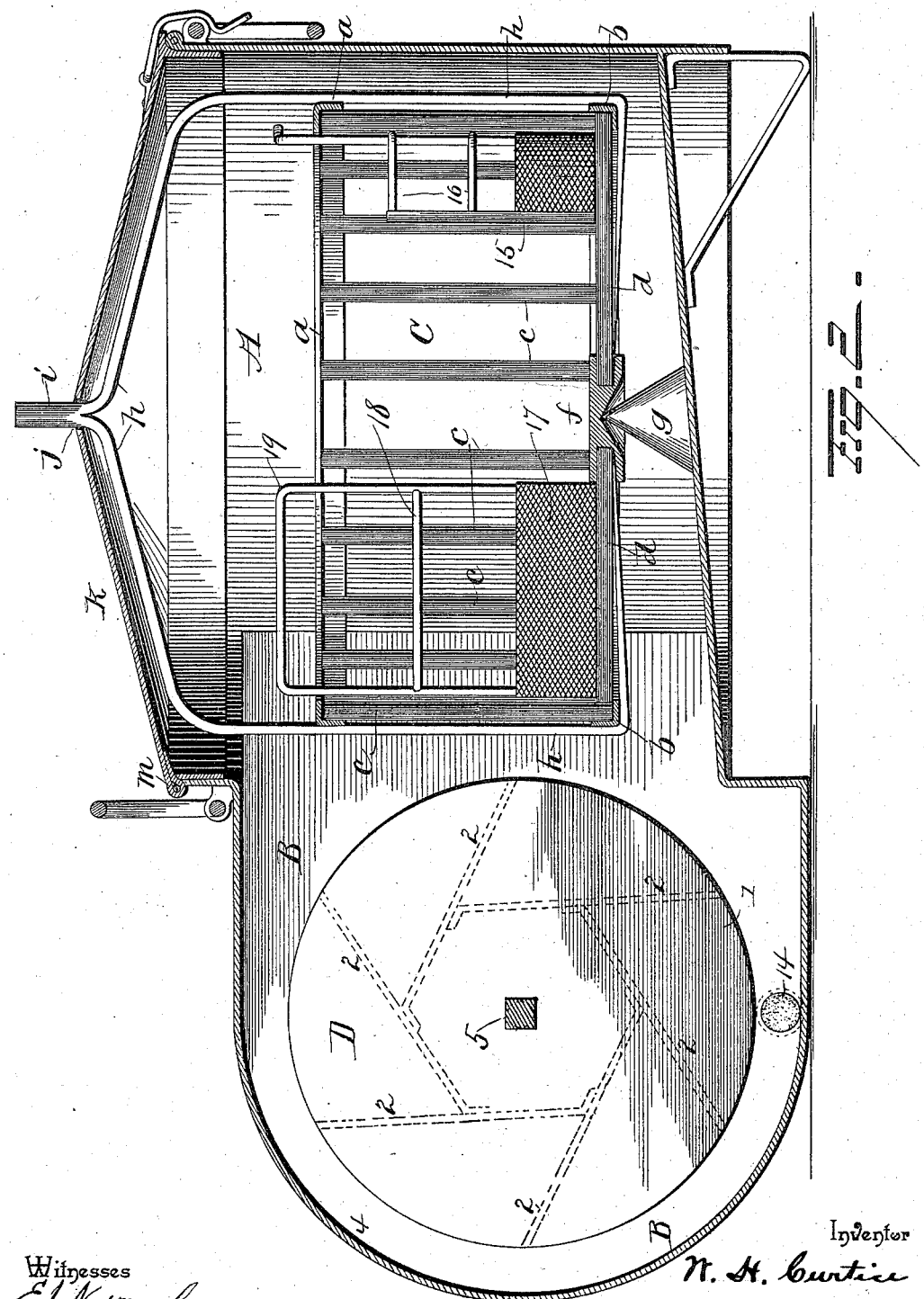

UNITED STATES PATENT OFFICE.

WILLIAM H. CURTICE, OF LOUISVILLE, KENTUCKY.

DISH-CLEANER.

SPECIFICATION forming part of Letters Patent No. 577,725, dated February 23, 1897.

Application filed June 6, 1896. Serial No. 594,548. (No model.)

*To all whom it may concern:*

Be it known that I, WILLIAM H. CURTICE, a resident of Louisville, in the county of Jefferson and State of Kentucky, have invented certain new and useful Improvements in Dish-Washing Machines; and I do hereby declare the following to be a full, clear, and exact description of the invention, such as will enable others skilled in the art to which it appertains to make and use the same.

My invention relates to an improvement in washing apparatus, and more particularly to dish-washers, the object of the invention being to so construct a dish-washer that the basket or receptacle for the dishes can be readily removed from the apparatus for the purpose of having the dishes placed into it; to so construct and arrange the apparatus that the water will be agitated and thrown against the dishes in such manner as to rotate the basket or receptacle containing them and at the same time thoroughly cleanse the dishes, and to produce a dish-washing apparatus which shall be simple in construction, comparatively cheap to manufacture, and effectual in all respects in the performance of its functions.

With these objects in view the invention consists in certain novel features of construction and combinations and arrangements of parts, as hereinafter set forth, and pointed out in the claims.

In the accompanying drawings, Figure 1 is a plan view with the casing partly in section. Fig. 2 is a vertical sectional view on line *x x* of Fig. 1.

A represents a cylindrical shell or drum, and B a lateral compartment disposed tangentially to the drum or shell A and communicating at one end therewith, the outer end of said compartment B being closed and preferably curved. The drum or shell A is adapted for the reception of a basket or receptacle C, (which will be hereinafter described in detail,) and the compartment B is adapted for the reception of a water-wheel D. The water-wheel D comprises two disks 1, preferably of sheet metal, and a series of inclined or tangentially-arranged paddles 2, the latter being so arranged relatively to each other as to form a series of V-shaped buckets. The water-wheel is provided at one side with a journal 3, mounted in the side 4 of the compartment B, and on this journal the wheel is adapted to rotate freely. A journal 5 is connected with the other side of the water-wheel, so as to rotate therewith, and is mounted to rotate in an opening in the side 6 of the compartment B and also in an opening in a plate 7, secured to said side 6. The free end of the journal 5 is made angular for the reception of a pinion 8, adapted to receive motion from an internally-toothed flange 9, which projects from a plate or disk 10. The plate or disk 10 is provided in its center with a hub 11, mounted loosely on a pintle 12, projecting from the plate 7, and from said plate or disk 10 a handle 13 projects. It is evident that by rotating the plate or disk 10 by means of the handle 13 motion will be imparted to the water-wheel, and the water contained in the apparatus will thus be thrown into the drum or shell A and against the dishes in the basket or receptacle C in such manner as to thoroughly cleanse said dishes and cause the basket or receptacle to revolve.

The shell or drum A is provided with an inclined bottom adapted to drain into the compartment B, and the latter is provided with an outlet 14.

The dish receptacle or basket C is made cylindrical in form and of a number of bars or slats, preferably of wood and properly spaced apart. In constructing the dish receptacle or basket I employ two rings *a b*, of angle-iron, or sheet metal bent in the form of angle-iron, and between said rings a series of bars or slats *c* is secured and form the vertical wall of the basket, said bars or slats being preferably made in the form of round wooden posts. The bottom of the dish receptacle or basket C is composed of a radial series of slats or bars *d*, similar in form and material to the slats or bars *c*. The inner ends of the bars *d* are secured in a central block or plate *f*, and from the latter said bars or slats *d* radiate and at their outer ends are secured to the ring *b*. Thus it will be seen that the vertical wall and the bottom of the receptacle or basket are open, so that the water can freely enter the same and cleanse the dishes contained therein.

The under face of the central plate or block *f* is dished for the reception of a conical bearing or support g, which projects upwardly from the bottom of the drum or shell A. A bail h is secured to the basket or receptacle C and extends under the same, the free extremities of the arms of said bail being secured to the plate or block f and being secured between their ends to the rings a and b. The bail h terminates centrally over the basket or receptacle in a vertical post i, which passes loosely through a hole j in the conical cover k of the drum or shell A, said cover being attached to the drum or shell by means of a hinge m.

From the construction and arrangement of parts above described it will be seen that when the water-wheel is rotated the water contained in the apparatus will be thrown with considerable force into the basket or receptacle C and against the dishes, which are placed therein with their edges turned outwardly, thus thoroughly cleansing said dishes. As the compartment B in which the water-wheel is located is disposed tangentially to the drum or shell A and the basket or receptacle C therein the water will be directed against the dishes in such manner and with such force as to cause the basket to revolve. It will be seen, therefore, that the water-wheel serves to throw the water into the basket for the purpose of washing the dishes and also for revolving the basket or receptacle, so that all the dishes therein will be subjected to the action of the water from the water-wheel.

The basket or receptacle C can be readily removed from the apparatus to be charged with dishes, after which it can be easily and quickly placed in position, and the dishes washed in the manner above explained.

In order to provide a convenient and efficient receptacle for knives, forks, spoons, &c., I employ a crescent-shaped holder 15, of perforated metal or wire-cloth, said holder having frames 16 for supporting the knives, forks, spoons, &c., in a vertical position. For small articles triangular baskets 17, of perforated metal or wire-cloth, can be used, and these may also be provided with a frame 18 for supporting the articles to be washed and with a handle 19. If desired, the basket or receptacle C might be entirely filled with triangular baskets or holders 17.

My improvements are very simple in construction, comparatively cheap to manufacture, and effectual in all respects in the performance of their functions.

Various slight changes might be made in the details of construction of my invention without departing from the spirit thereof or limiting its scope, and hence I do not wish to limit myself to the precise details of construction herein set forth.

Having fully described my invention, what I claim as new, and desire to secure by Letters Patent, is—

1. In a dish-washing machine, the combination with a drum or shell, of a revoluble dish-receptacle within said drum or shell, and a water-wheel arranged tangentially to said dish-receptacle, whereby to throw water against dishes in said receptacle and cause the latter to revolve, substantially as set forth.

2. In a dish-washing machine, the combination with a drum or shell, of a revoluble dish-receptacle within said drum or shell, a compartment arranged at a tangent to said drum or shell and communicating therewith and a water-wheel in said compartment in line with one side of the wheel whereby the impact of the water thereon causes it to rotate, substantially as set forth.

3. In a dish-washing machine, the combination with a drum or shell, of an open basket or receptacle adapted to revolve in said drum or shell and to be removed therefrom, and a water-wheel so arranged as to throw water against dishes in said basket or receptacle and thereby revolve the latter, substantially as set forth.

4. In a dish-washing apparatus, the combination with a drum or shell, of a revoluble open basket or dish-receptacle in said drum or shell, a conical bearing or support for the bottom of said basket or receptacle, a cover for said drum or shell, a bail secured to the basket and having a post passing loosely through said cover and means for throwing water into the drum or shell so as to revolve the basket and wash dishes contained therein, substantially as set forth.

In testimony whereof I have signed this specification in the presence of two subscribing witnesses.

WILLIAM H. CURTICE.

Witnesses:
JNO. M. RAMSAY,
W. H. DAVIS.